United States Patent [19]

Lanza et al.

[11] Patent Number: 5,264,489
[45] Date of Patent: Nov. 23, 1993

[54] PROCESS FOR THE PREPARATION OF BLOCK COPOLYMERS

[75] Inventors: Emmanuel Lanza, Waterloo; Jean Naveau, Nivelles, both of Belgium; Michel Daumerie, Seabrook, Tex.

[73] Assignee: Fina Research, S.A., Belgium

[21] Appl. No.: 38,043

[22] Filed: Mar. 26, 1993

Related U.S. Application Data

[63] Continuation of Ser. No. 438,906, Nov. 17, 1989 filed as PCT/BE89/0019, Apr. 27, 1989, abandoned.

[30] Foreign Application Priority Data

Apr. 27, 1988 [BE] Belgium ................... 0880478

[51] Int. Cl.$^5$ ............................. C08L 83/00
[52] U.S. Cl. ....................... 525/101; 525/102; 525/105; 525/123; 525/153; 525/171
[58] Field of Search ............... 525/102, 105, 123, 155, 525/171, 101

[56] References Cited

U.S. PATENT DOCUMENTS

| | | | |
|---|---|---|---|
| 2,684,391 | 7/1954 | Jones | 260/793 |
| 3,639,521 | 2/1972 | Hsieh | 525/98 |
| 3,751,389 | 8/1973 | Hotta et al. | 260/28.5 B |
| 4,091,198 | 5/1978 | Smith et al. | 525/122 |
| 4,417,027 | 11/1983 | Milkovich | 525/314 |
| 4,489,187 | 12/1984 | Middlebrook | 524/201 |

FOREIGN PATENT DOCUMENTS 0174795 3/1986 European Pat. Off.

*Primary Examiner*—Bernard Lipman
*Attorney, Agent, or Firm*—Jim D. Wheelington; John K. Abokhair; M. Norwood Cheairs

[57] ABSTRACT

Coupling of block base copolymers terminated by a lithium atom of the typical formula S-B-Li, in which S is a monovinylaromatic hydrocarbon block and B is a conjugated diene block, by the use of at least one difunctional deactivating coupling agent and at least one polyfunctional deactivating coupling agent in a molar ratio such that the linear polymer obtained by coupling represents 65 to 95% by weight of the total polymer material obtained by coupling.

11 Claims, No Drawings

PROCESS FOR THE PREPARATION OF BLOCK COPOLYMERS

This is a continuation of co-pending application Ser. No. 07/438,906 filed on Nov. 17, 1989 now abandoned.

The present invention relates to a new process for the preparation of block copolymers in the presence of systems of agents for coupling polymeric blocks. The present invention particularly relates to a process for the preparation of linear or quasi-linear block copolymers formed from polyvinylaromatic-conjugated polydiene blocks coupled by coupling agents.

The present invention also relates to the block copolymers prepared with the new systems of coupling agents and having improved physical properties with respect to those of the usual linear block copolymers.

The coupling of polymer chains terminated by a lithium atom (also called living base polymers) is well-known, as are the coupling agents used for this purpose. In general, a polymer chain terminated by a lithium atom is reacted with a compound having two or more functional groups capable of reacting with the carbon-lithium bond of the polymer chain terminated by a lithium atom.

According to whether the intention is to form linear or multi-branched polymers, coupling agents having two or, respectively, several reactive sites or reaction groups are used.

Such coupling agents for the formation of linear block copolymers are, for example, dihaloalkanes, such as dibromomethane, as is described in British Patent 1,014,999.

The use of systems of polyfunctional coupling agents has also been described in European Patent 2,012, according to which the addition of a polyvinyl monomer which acts as a non-deactivating coupling agent is used in the first instance, and a di- or trifunctional coupling agent, which may or may not be deactivating, is used in the second instance. This type of system of coupling agent leads to numerous branchings which are difficult to control.

U.S. Pat. No. 4,304,886 discloses the use of mixtures of coupling agents, which may be any coupling agents, in order to obtain a polymer having a desired total functionality greater than 2 without having to blend several polymers. However, said patent teaches that such system of coupling agents mixture lead to worse mechanical properties.

U.S. Pat. No. 3,880,954 describes the use of alkyl-polyalkoxysilane as the sole coupling agent having at least two and preferably three alkoxy groups; however, this type of agent does not by itself allow the properties desired to be obtained, and moreover it leads to the formation of troublesome by-products, such as the corresponding alcohols.

It is moreover well-known that the residue of the coupling agent remains in the copolymer formed and is thus capable of leaving toxic residues in the polymers, which may be troublesome in certain uses and in particular in the foodstuff packaging sector.

There is thus a need for the development of a process for the preparation of block copolymers which utilizes coupling agents which do not present residual toxicity while preserving at least the desired physical properties.

The present invention relates to a process for the preparation of vinylaromatic-conjugated diene copolymers with new systems of coupling agents which enable block copolymers having improved physical and rheological properties to be obtained.

The aim of the present invention is also a process for the preparation of monovinylaromatic conjugated diene block copolymers which enables coupling agents essentially without residual toxicity to be involved.

The process according to the invention for the production of block copolymers by coupling of block base copolymers terminated by a lithium atom of the typical formula S-B-Li, in which S is a monovinylaromatic hydrocarbon block and B is a conjugated diene block, is characterized in that at least one difunctional deactivating coupling agent and at least one polyfunctional deactivating coupling agent are used in a ratio such that the linear polymer obtained by coupling represents 65 to 95% by weight of the total polymer material obtained by coupling.

In the process according to the present invnetion, a block base copolymer is prepared by polymerization of a vinylaromatic monomer to give a first block called S, in the presence of an organolithium compound as a catalyst and in the presence of an inert hydrocarbon as the solvent. A conjugated diene monomer is then added (to the reaction medium) to give a block copolymer of the type S-B-Li, in which B represents the conjugated diene block.

The catalyst used is generally an alkyllithium, which may be branched such as those of secondary alkyl radicals, having 3 to 8 carbon atoms. However, n-butyllithium is preferably used purely for reasons of ease of procurement.

The solvents used are generally paraffinic, cycloparaffinic and aromatic hydrocarbons and their mixtures. Examples are n-pentane, n-hexane, n-heptane, 2,2,4-trimethylpentane, cyclohexane, cyclopentene, benzene, toluene and xylene. A polar solvent, such as cyclic ethers (THF) or acyclic ethers or tertiary amines, can be incorporated in order to obtain the formation of a specific polymeric microstructure, such as, for example, an increased amount of vinyl units, as well as random S/B blocks.

At this stage of the process, the Applicant has found unexpectedly that by reacting the block base copolymer terminated by a lithium atom, called the living base polymer, with at least one difunctional coupling agent and at least one polyfunctional coupling agent in a molar ratio such that the linear polymer obtained by coupling represents 65 to 95% by weight of the total polymers obtained by coupling, it has been possible to improve the physical and rheological properties of the block polymers. More particularly, the Applicant has found that the respective proportions of the various coupling agents should be observed, and in particular the weight ratio between the polymers obtained by coupling chains with the difunctional and polyfunctional agents, which should be between 65/35 and 95/5, preferably between 75/25 and 90/10. In fact, if sufficient difunctional coupling agent is not used, the desired properties are not observed. On the other hand, if a minimum of polyfunctional coupling agent is not used, the synergism from the point of view of the properties is not reached.

Difunctional coupling agents which may be used are, in particular, dihalosilanes, monoesters and diketones. More particularly, dialkyldihalosilanes, dicycloalkyldihalosilanes or diaryldihalosilanes are used.

The polyfunctional coupling agent used is a compound chosen from the compounds of polyepoxides, polyisocyanates, polyimines, polyaldehydes, polyketones, polyhalides such as polyhalides of silicon and polyhalosilanes, polyanhydrides and polyesters, as well as their mixtures.

Polyfunctional coupling agents having a functionality of between 3 and 6, the most preferred value being 4, are preferably used.

Examples of these compounds which may be mentioned in particular as the difunctional coupling agent are dimethyldichlorosilane, dicyclohexyldichlorosilane and diphenyldichlorosilane, as well as methyl acetate, ethyl acetate, methyl benzoate, phenyl benzoate and 2,5-hexanedione.

Polyfunctional coupling agents which may be mentioned are: polyepoxidized vegetable oils, such as epoxidized soya or linseed oil, 1,2;5,6;9,10-triepoxydecane, benzene 1,2,4-triisocyanate, tri(1-aziridinyl)phosphine oxide (polyimine), 1,4,7-naphthalenetricarboxaldehyde, 1,4,9,10-anthracenetetrone, silicon tetrachloride, silicon tetrabromide, ethyltrichlorosilane, methyltrichlorosilane, trichlorosilane, pyromellitic (1,2,4,5-benzenetetracarboxylic) dianhydride, diethyl adipate, dimethyl phthalate and diethyl phthalate.

It should be pointed out that compounds combining more than one type of functional group can also be used as the polyfunctional coupling agent, such as 1,2,4,5-diepoxy-3-pentanone or gamma-glycidoxypropyltrimethoxysilane.

Of the difunctional and polyfunctional agents, those of lower residual toxicity and preferably those of the type $SiX_nR_{4-n}$ (where X is a halogen, preferably Cl, R is an alkyl, cycloalkyl or aryl, radical, preferably methyl, and n is an integer from 2 to 4) will be chosen.

The amounts of coupling agent to be used can easily be calculated. Indeed the reaction between a coupling agent having a molecular weight $M_1$ and a functionality n and S-B-Li chains of molecular weight $M_2$ carried out in a molar ratio of 1:n will theoretically give a copolymer of molecular weight $M_1 + nM_2$ reduced by the MW of the coupling by-products; deviations are due essentially to traces of impurities or to heat, which can, for example, deactivate the S-B-Li chains (giving copolymers with a molecular weight of about $M_1$, as found in the final product). The total amount of coupling agents used is preferably calculated in a simple manner from the total of S-B-Li chains, but less can be used if preservation of an increased proportion of the S-B copolymer in the final product is desired.

The vinylaromatic compound which constitutes the block S of the block copolymer can be styrene, vinyltoluene, vinylxylene or vinylnaphthalene; whilst the conjugated dienes are generally chosen from butadiene, isoprene, methylisoprene and their homologues.

The block copolymer formed in this way by the process according to the invention is present in two forms, one a linear form of the formula S-B-C-B-S, in which C represents the represents the residue of the coupling agent, in the proportion of 65 to 95% by weight, preferably 75 to 90% by weight, and the other a branched form as the balance.

The molecular weight (weight-average molecular weight) of the base copolymer can vary within wide limits and is generally between 10,000 and 150,000 and preferably between 15,000 and 100,000, the polyvinylaromatic block representing 20 to 40% by weight, preferably 25 to 35%, of the base copolymer.

The process according to the invention is generally realized by polymerizing a first block of vinylaromatic monomer, usually styrene, at a temperature between 20° and 60° C. for a period of 20 minutes to 1 hour in the presence of an n-alkyllithium catalyst and in the presence of cyclohexane as the solvent.

When all the vinylaromatic monomer, usually styrene, has been polymerized, a monomer of a conjugated diene, such as 1,3-butadiene, is introduced into the solution. This monomer reacts starting entirely at the living ends.

When this stage of the process has been reached, polymeric chains of the type S-B-Li have been formed. The coupling agents as defined above are then introduced. A mixture comprising about 80% by weight of dichlorodimethylsilane with 20% by weight of $SiCl_4$ or methyltrichlorosilane is usually taken.

The coupling reaction takes 0.1 to 1 hour at a temperature between 10° and 120° C.

After the coupling, any non-coupled living polymeric chains present can be deactivated by addition of a customary chain terminator, such an alcohol or polyalkylphenol. An antioxidant system suitable for the final use is then added. In principle, there should be no coupling agent which has not reacted; it is advantageous to use compounds of the type $SiX_nR_{4-n}$ as coupling agents, since any excess which has not reacted will be converted into non-toxic residues during steaming of the solvent.

The following examples are given for better illustration of the process of the present invention.

EXAMPLE 1

Styrene was first polymerized in the presence of n-butyllithium as the catalyst and in the presence of cyclohexane as the solvent. The reaction was started at a temperature of 50° to 55° C. and ended at a temperature of about 60° to 65° C.

1,3-butadiene with cyclohexane as the solvent was then added. This polymerisation was carried out a temperature between on average 60° and 90° C. When this polymerisation had ended, living chains of the type S-B-Li had been obtained.

A mixture of 86% by weight of dichlorodimethylsilane (DCDMS) and 14% by weight of $SiCl_4$ was then added.

The coupling reaction was carried out at 50° C. for 1 hour.

The block copolymer obtained (also called pure polymer) contained 31% styrene and 69% butadiene, the properties being shown below.

After addition of antioxidants, the copolymer obtained was then subjected to steaming treatment to remove the solvent.

| Characteristics of the copolymer obtained | |
| --- | --- |
| % total styrene | 31.0% by weight |
| Molecular weight (weight-average) | 93,000 |
| % free PS | 7% by weight |
| % base polymer | 17% by weight |
| Coupling agents | DCDMS/SiCl$_4$ (86/14 by weight) |
| 80% by weight of polymeric chains are coupled via DCDMS (by weight) | |
| 20% by weight of polymeric chains are coupled via SiCl$_4$ (by weight) | |
| Properties of the copolymer material obtained | standard no. |
| Hardness, Shore A/1 | 81 ASTM - D 2240 |
| Abrasion (10 N, 40 m), mm$^3$ | 110 DIN - 53516 |
| Tensile strength at break, MPa | 23 ASTM - D 412 |
| Elongation at break, % | 770 ASTM - D 412 |

-continued

| | | |
|---|---|---|
| Tear strength, N/mm | 23 | ASTM - D 624 |

The polymer thus formed contains no toxic residue of the coupling agent.

By way of comparison, coupling of the same polymeric chains was carried out with one of the simple toxic coupling agents, 1,2-dibromoethane (DBE).

The following properties were found:

| | |
|---|---|
| Hardness | 79 |
| Abrasion | 125 |
| Tensile strength at break | 18 |
| Elongation | 650 |
| Tear strength | 22 |

Moreover, this type of agent has the disadvantage of being present in the final polymer, which increases the toxicity thereof.

This demonstrates that with the process according to the invention, not only is the problem of residual toxicity eliminated, but moreover the properties of the final block copolymer material obtained are improved considerably.

EXAMPLE 2

A polymer material as described in example 1 is prepared, except that a mixture comprising 78% by weight of ethyl acetate (EA) and 22% by weight of diethyl adipate (DEA) is added as the coupling agent.

Characteristics of the pure polymer:

| | |
|---|---|
| % total styrene: | 31.5 |
| Molecular weight: | 98,000 |
| % free PS: | 5 |
| % base polymer: | 15 |
| Coupling agent: | ethyl acetate (EA)/diethyl adipate (DEA) (78/22 by weight) |

80% by weight of the polymeric chains are coupled via EA
20% by weight of the polymeric chains are coupled via DEA Properties of the pure polymer material

| | |
|---|---|
| Hardness, Shore A: | 83 |
| Abrasion, DIN, mm$^3$: | 100 |
| Tensile strength: | 21 (at break) |
| Elongation: | 800 (at break) |
| Tear strength: | 25 |

The polymer material thus formed does not contain any toxic residue of the coupling agents used.

EXAMPLE 3

A polymer material as described in example 1 is prepared, except that a mixture comprising 94% by weight of dichlorodimethylsilane and 6% by weight of SiCl$_4$ is added as the coupling agent.

Characteristics of the pure polymer

| | |
|---|---|
| % total styrene: | 30.8 |
| Molecular weight: | 95,000 |
| % free PS: | 4 |
| % base polymer: | 14 |
| Coupling agent: | DCDMS/SiCl$_4$ (94/6. weight) |

91% of the polymeric chains are coupled via DCDMS (by weight)
9% of the polymeric chains are coupled via SiCl$_4$ (by weight)

Properties of the pure polymer material

| | |
|---|---|
| Hardness, Shore A/1: | 80 |
| Abrasion, DIN mm$^3$: | 95 |
| Tensile strength: | 19 (at break) |
| Elongation: | 840 (at break) |
| Tear strength: | 23 |

The polymer material thus formed does not contain any toxic residue of the system of coupling agents used.

EXAMPLE 4

The block copolymer prepared in example 1 was used in a polymeric composition for rubber articles for industrial use:

This composition comprised (parts by weight):

| | |
|---|---|
| Copolymer: | 70 |
| EVA 00 328: | 30 (ethylene-vinyl acetate 28% copolymer; fluidity 3 g/10 min at 190° C./2.16 kg; sold under the name Escorene by ESSO) |
| Medicinal oil: | 35 |
| Stearic acid: | 0.5 |
| Wax: | 0.5 (microcrystalline wax; density 0.91 g/cm$^3$; sold under the name Antilux by RHEIN-CHEMIE) |
| 2,4-Bis(n-octylthio)-6-(4-hydroxy-3,5-di-tert-butylanilinol)-1,3,5-triazine: | 0.25 (sold by Ciba-Geigy under the name IRGANOX 565) |
| TiO$_2$: | 3.0 |

The properties of this composition were as follows, compared with those of a mixture comprising the copolymer coupled via 1,2-dibromoethane.

| Properties | Copolymer coupled via DBE | Copolymer according to example 1 | Standard method |
|---|---|---|---|
| Hardness (Shore A/1) | 54 | 54 | ASTM-D2240 |
| Abrasion (10N, 40 m) (mm$^3$) | 350 | 330 | DIN-53516 |
| Fluidity (5 kg/190° C.) (g/10 min) | 19 | 25 | ASTM-D1238 |
| Residual deformation after compression (22h/23° C.) | 29 | 27 | ASTM-D395 |
| Rebound impact strength | 53 | 59 | DIN-53512 |
| Tensile strength at 300% elongation (MPa) | 1.6 | 1.9 | ASTM-D412 |
| Tensile strength at break (MPa) | 9.9 | 9.6 | ASTM-D412 |
| Elongation at break (%) | 950 | 1100 | ASTM-D412 |
| Tear strength (N/mm) | 16 | 17 | ASTM-D624 |

EXAMPLE 5

The block copolymer prepared in example 1 was also used in a composition intended for "road bitumen" applications. This composition comprised:

Bitumen B 180-200: 85% by weight
Copolymer: 15% by weight

The properties of this composition were as follows, compared with those of a mixture comprising copolymers coupled via 1,2-dibromoethane (comparative example 5a), dichlorodimethylsilane (DCDMS, comparative example 5b) or dichlorodiphenylsilane (DCDPS, comparative example 5c).

| Properties | Example 5 | Comparative examples | | |
|---|---|---|---|---|
| | | 5a | 5b | 5c |
| Viscosity at 180° C., Pa.s | 4.4 | 4.9 | 4.8 | 8.3 |
| Viscosity at 160° C., Pa.s | 11.8 | 13.8 | 12.0 | 17.1 |
| Penetration (25° C.) 0.1 mm | 49 | 55 | 57 | 54 |
| Penetration (50° C.) 0.1 mm | 101 | 123 | 145 | 137 |
| Softening point, °C. | 111 | 112 | 107 | 108 |
| Cold bending point, °C. | −40 | −35 | −25 | −35 |
| Plastic flow at 80° C., 45° | | | | |
| after 2h 30 min, mm | 3 | 5 | 6 | 5 |
| after 5h, mm | 7 | 10 | 9 | 10 |
| after 24h, mm | 10 | 12 | 16 | 13 |
| Coupling agent | DCDMS + SiCl$_4$ | DBE | DCDMS | DCDPS |

The specifications of the standard methods ASTM-D5 and D36 respectively were followed for measurement of the penetration and of the softening point.

This example demonstrates that the process of the invention enables better rheological and physical properties to be obtained.

We claim:

1. Process for the production of block copolymers comprising coupling of block base copolymers terminated by a lithium atom of the typical formula S-B-Li, in which S is a monovinylaromatic hydrocarbon block and B is a conjugated diene block, wherein at least one difunctional deactivating coupling agent and at least one polyfunctional deactivating coupling agent are used in a molar ratio such that the linear polymer obtained by coupling represents 65 to 95% by weight of the total polymer material obtained by coupling.

2. Process according to claim 1, wherein the linear polymer obtained by coupling represents 75 to 90% by weight of the total polymer material obtained by coupling.

3. Process according to claim 1, wherein at least one coupling agent having a functionality of between 3 and 6 is used as the polyfunctional deactivating coupling agent.

4. Process according to claim 1, wherein a silane of the type $SiX_2R_2$, where X is a halogen and R is an alkyl, cycloalkyl or aryl radical, is used as the difunctional deactivating coupling agent.

5. Process according to claim 1, wherein a silane of the type $SiX_2R_{4-n}$, where X is a halogen, n is an integer equal to 3 or 4 and R is an alkyl, cycloalkyl or aryl radical, is used as the polyfunctional deactivating coupling agent.

6. Process according to claim 4, wherein X is chlorine.

7. Process according to claim 4, wherein R is chosen from the group consisting of the methyl, ethyl and phenyl radicals.

8. Process according to claim 3 wherein at least one coupling agent having a functionality equal to 4 is used as the polyfunctional deactivating coupling agent.

9. Process according to claim 1, wherein the total amount of coupling agents used is calculated such that all the chains are coupled.

10. Process according to claim 5, wherein X is chlorine.

11. Process according to claim 5, wherein R is chosen from the group consisting of the methyl, ethyl and phenyl radicals.

* * * * *